United States Patent
Vogt

(10) Patent No.: US 8,662,763 B2
(45) Date of Patent: Mar. 4, 2014

(54) L-SHAPED HOLDER FOR OPTICAL DEVICES

(76) Inventor: Philippe Vogt, Bussieres (FR)

(*) Notice: Subject to any disclaimer, the term of this patent is extended or adjusted under 35 U.S.C. 154(b) by 0 days.

(21) Appl. No.: 13/512,259

(22) PCT Filed: Jan. 27, 2011

(86) PCT No.: PCT/EP2011/051165
§ 371 (c)(1),
(2), (4) Date: May 25, 2012

(87) PCT Pub. No.: WO2011/104063
PCT Pub. Date: Sep. 1, 2011

(65) Prior Publication Data
US 2012/0281976 A1    Nov. 8, 2012

(30) Foreign Application Priority Data
Feb. 24, 2010  (DE) ............ 20 2010 002 724 U

(51) Int. Cl.
*G03B 17/00* (2006.01)
(52) U.S. Cl.
USPC ........................................................ 396/428
(58) Field of Classification Search
USPC ................ 396/419, 420, 428; 248/187.1
See application file for complete search history.

(56) References Cited

U.S. PATENT DOCUMENTS

| | | | |
|---|---|---|---|
| 2,671,392 A * | 3/1954 | Robins ............ | 396/329 |
| 2,840,334 A | 6/1958 | Cauthen | |
| 3,006,052 A | 10/1961 | Stickney et al. | |
| 3,612,462 A | 10/1971 | Mooney et al. | |
| 3,737,130 A | 6/1973 | Shiraishi | |
| 3,855,602 A | 12/1974 | Hoos | |
| 4,319,825 A * | 3/1982 | Newton ............ | 396/422 |
| 4,473,177 A * | 9/1984 | Parandes ............ | 224/191 |
| 4,752,794 A | 6/1988 | Bohannon | |
| 5,074,662 A | 12/1991 | Sullivan | |
| 5,322,251 A | 6/1994 | Schumer et al. | |
| 5,737,657 A | 4/1998 | Paddock et al. | |
| 5,806,734 A * | 9/1998 | Scott ............ | 224/265 |

(Continued)

FOREIGN PATENT DOCUMENTS

| | | |
|---|---|---|
| DE | 7235189 U | 3/1974 |
| DE | 8609247 U1 | 12/1987 |

(Continued)

OTHER PUBLICATIONS

International Search Report of the International Searching Authority from corresponding Patent Cooperation Treaty (PCT) Application No. PCT/EP2011/051165 mailed Mar. 25, 2011.

(Continued)

*Primary Examiner* — W B Perkey
(74) *Attorney, Agent, or Firm* — Gardner, Linn, Burkhart & Flory, LLP

(57) ABSTRACT

An L-shaped holder for optical devices, in particular cameras, comprising a first exchangeable plate that can be fastened to the housing of the optical device by means of a screw, a second exchangeable plate and a connector having two webs separated by an angled section for connecting the two exchangeable plates, each exchangeable plate being arranged on one of the webs of the connector, which is characterised in that the exchangeable plates are connected to the connector such that the exchangeable plates can be moved on the connector.

20 Claims, 2 Drawing Sheets

(56) References Cited

U.S. PATENT DOCUMENTS

| | | |
|---|---|---|
| 5,870,641 A | 2/1999 | Chrosziel |
| 5,908,181 A * | 6/1999 | Valles-Navarro .......... 248/177.1 |
| 6,042,277 A | 3/2000 | Errington |
| 6,435,738 B1 | 8/2002 | Vogt |
| 6,663,299 B1 | 12/2003 | Shupak |
| 6,773,172 B1 | 8/2004 | Johnson et al. |
| 6,827,319 B2 | 12/2004 | Mayr |
| 6,988,846 B2 | 1/2006 | Vogt |
| 6,991,834 B1 * | 1/2006 | Gibbons et al. ................. 428/1.2 |
| 7,178,997 B2 * | 2/2007 | Claudi et al. .................. 396/428 |
| 7,185,862 B1 | 3/2007 | Yang |
| D591,325 S | 4/2009 | Dordick |
| 7,588,376 B2 | 9/2009 | Friedrich |
| 7,823,316 B2 | 11/2010 | Storch et al. |
| 8,075,203 B2 | 12/2011 | Johnson |
| 8,109,681 B2 * | 2/2012 | McAnulty .................... 396/428 |
| 2003/0194268 A1 | 10/2003 | Vogt |
| 2005/0041966 A1 | 2/2005 | Johnson |
| 2006/0177215 A1 | 8/2006 | Johnson |
| 2007/0031143 A1 | 2/2007 | Riccardi |
| 2010/0181454 A1 | 7/2010 | Vogt |
| 2012/0281976 A1 * | 11/2012 | Vogt .............................. 396/428 |

FOREIGN PATENT DOCUMENTS

| | | |
|---|---|---|
| DE | 29613027 U1 | 11/1996 |
| DE | 20203018 U1 | 5/2002 |
| DE | 20211351 U1 | 1/2003 |
| DE | 20203018 U1 | 5/2005 |
| DE | 10329224 B2 | 10/2005 |
| EP | 0323550 A1 | 7/1989 |
| EP | 1160499 A1 | 12/2001 |
| EP | 1365187 A1 | 11/2003 |
| EP | 0982613 B1 | 1/2004 |
| EP | 1893906 B1 | 8/2008 |
| WO | WO 2008028351 A1 | 3/2008 |
| WO | WO 2009016116 A1 | 2/2009 |
| WO | WO 2011023511 A1 | 3/2011 |

OTHER PUBLICATIONS

International Written Opinion of the International Searching Authority from corresponding Patent Cooperation Treaty (PCT) Application No. PCT/EP2011/051165.

Really Right Stuff: Catalogue 2009 [Online] URL:http:reallyrightstuff.com/mmRRS/Others/ReallyRightStuff2009.pdf.

Translation of International Preliminary Report on Patentability for corresponding International Application No. PCT/EP2011/051165 issued Aug. 28, 2012.

* cited by examiner

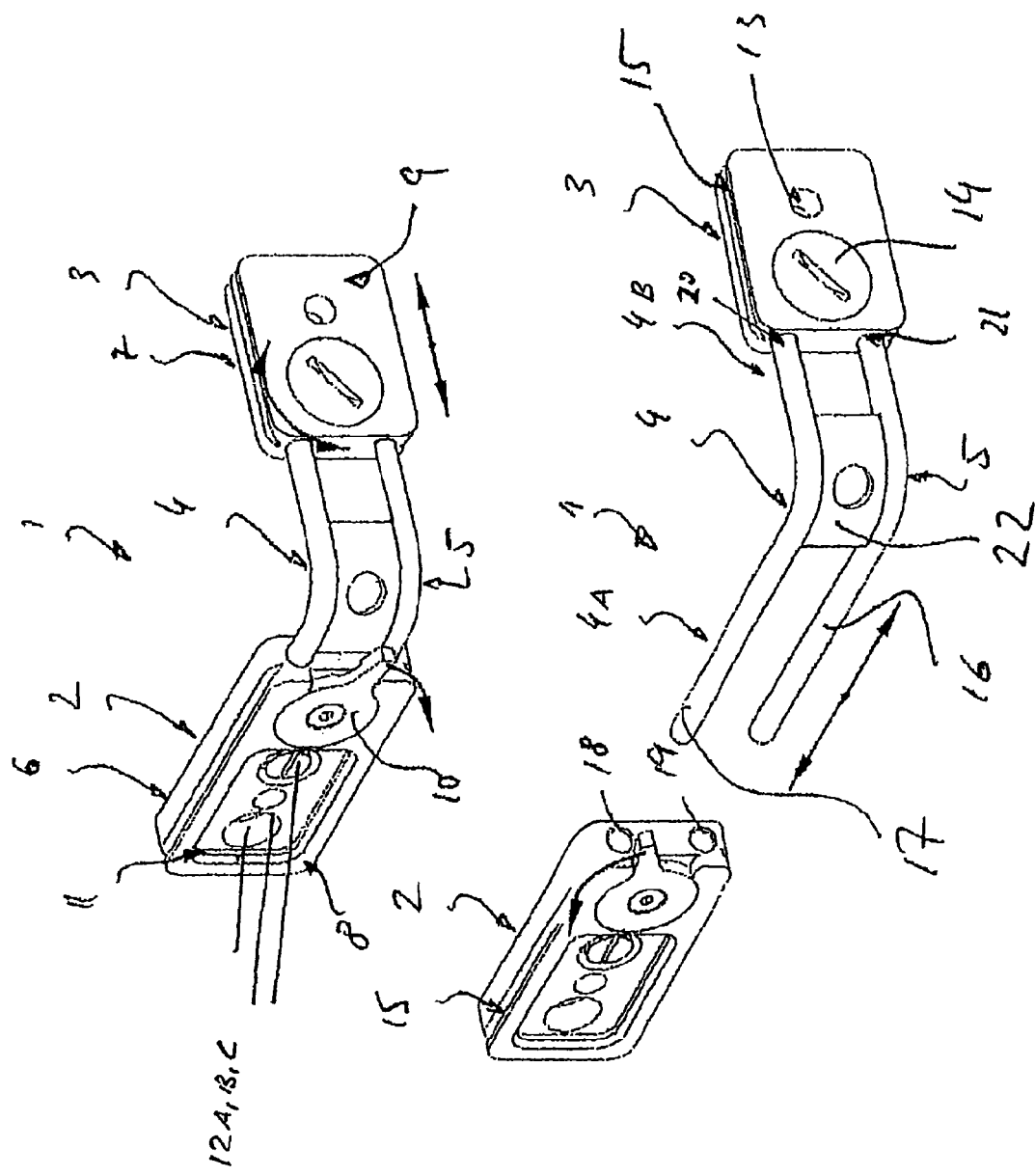

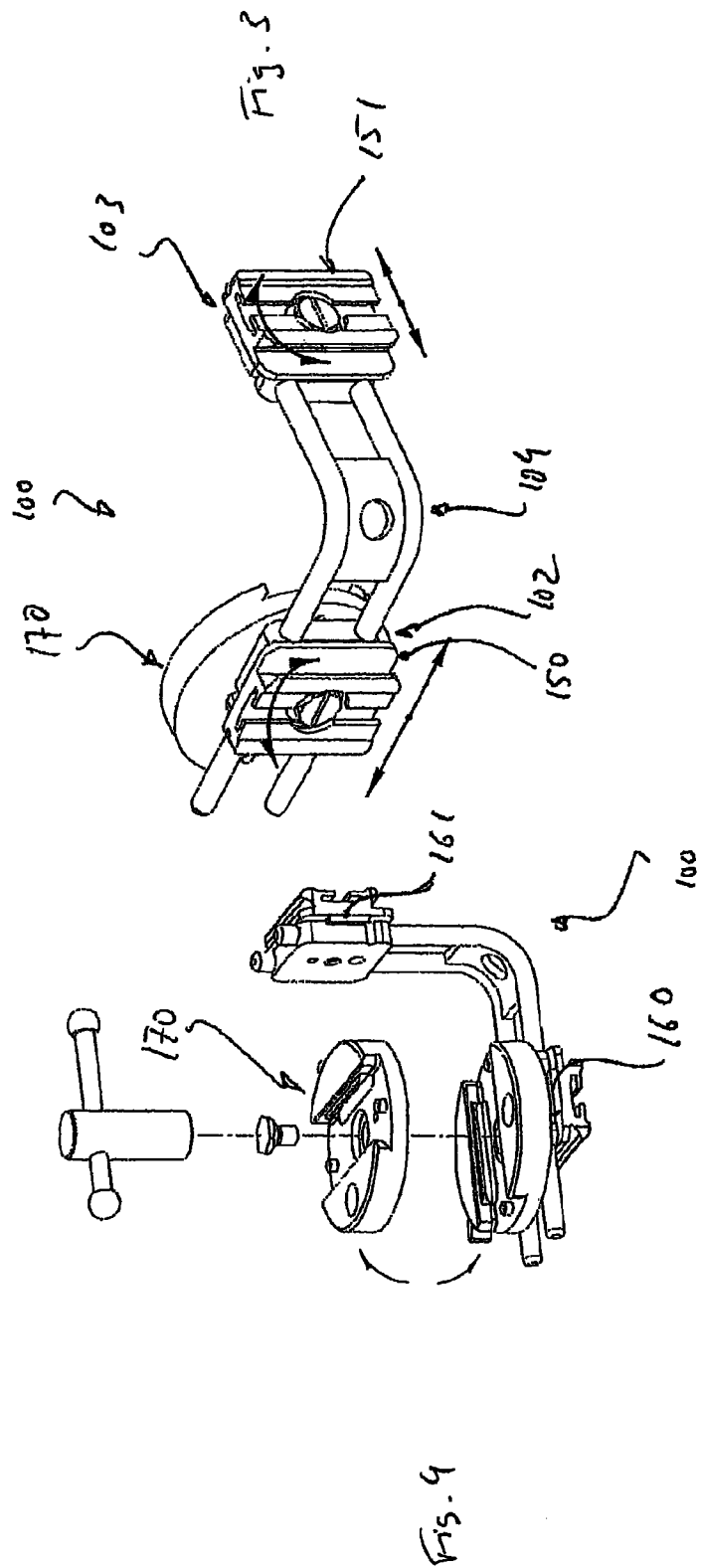

L-SHAPED HOLDER FOR OPTICAL DEVICES

BACKGROUND OF THE INVENTION

The invention relates to an L-shaped holder for optical devices, in particular for cameras.

Such L-shaped holders, or also called V-shaped holders, are known per se and include a holder which is screwed to cameras via the typically provided tripod screw thread and is in the shape of an L or V. One of the limbs, or the long limb, of the L or V is screwed below the camera and the other limb, or short limb, of the L or V engages around the camera housing on the side, wherein the camera housing corner is located in the corner of the L or V. To simplify matters, the term "L-shaped holder" will be used consistently hereinafter, it being clear that the term should encompass both versions.

The two limbs of the L of the L-shaped holders are provided with grooves extending in the longitudinal direction, in a similar manner to the so-called quick-change plates, so that the camera can be attached to a tripod head in a quick-release mechanism etc. either upright or on its side as selected. The grooves or quick-change plates thus allow quick and simple changing of the camera and its orientation on the tripod or tripod head. Therefore, when changing the camera orientation, it is not necessary to change the tripod setting or its head.

Without such a possibility, the camera would have to be pivoted on the tripod head itself or this tripod head would have to be placed on its side. However, this would inevitably completely change the image setting which means that all settings on the tripod would have to be changed.

An L-shaped holder also allows the camera to be disposed centrally in relation to the tripod head both when the camera is upright and also on its side. This is important since maximum stability for the tripod or the tripod head and its vibration-damping properties are achieved only with a central arrangement.

In general, it is even the case that the camera is used with such an L-shaped holder precisely over the centre point of the tripod, which additionally protects against camera-shake.

However, the known L-shaped holders are one-piece metal or synthetic material brackets which allow practically no adjustment possibilities for the camera and in addition are specifically adapted to each camera model.

SUMMARY OF THE INVENTION

The object of the present invention is to provide an L-shaped holder for optical devices, in particular cameras, by means of which the connections of the optical devices are not covered and which additionally is also adjustable. In addition, the L-shaped holder should be able to be attached simply and quickly to conventional tripod heads. Furthermore, it would be desirable if the L-shaped holder could be used universally for a large range of optical devices or camera models.

This object is achieved by the L-shaped holder for optical devices, in particular cameras, provided in accordance with the present invention, an embodiment of which comprises, a first change plate which can be attached to the housing of the optical device via a screw, having a second change plate and a connector having two limbs, separated by a bend, for connecting the two change plates, wherein each change plate is disposed on one of the limbs of the connector, and wherein the change plates are connected to the connector such that the change plates can be displaced on the connector.

By virtue of the fact that the change plates are connected to the connector such that the change plates can be displaced on the connector it is possible to provide an L-shaped holder for optical devices, in particular cameras, by means of which the connections of the optical devices are not covered since sufficient distance to create space for the connections and cables can be achieved by the displacement of the change plates on the connector, and which additionally is still adjustable so that it can be used universally for a large range of optical devices or camera models since it can be adapted to the respective housing size by the displacement of the change plates. In addition, the L-shaped holder can be attached simply and quickly to conventional tripod heads via the change plates.

A further advantage of this construction is that for normal landscape photographs, the entire L-shaped holder does not always have to be used, rather the connection including the second change plate can be removed.

The change plates can thus be displaced on their respective limb of the "L" (or V) on the one hand between the end of the limb and the bend between the limbs, but can also be removed entirely.

The term "camera" is understood in the present case to mean a photographic apparatus which can capture still or moving images on a photographic film or electronically on a magnetic video tape or digital storage medium.

If the connector includes two bars which are braced together, extend in parallel and are bent, then the cable connections to the connections which are typical in particular on digital single-lens reflex cameras, can be passed between the metal bars and, in addition a simple and light-weight construction is produced.

It is also feasible to use a single bar or profiled bar.

The bars preferably consist of metal. However, it is also feasible to use reinforced synthetic material. In a particular embodiment the bars are round bars.

It is expedient if the change plates comprise grooves extending in the longitudinal direction so that they can be used in a similar manner to the dovetail plates. These can therefore be used with the quick-change systems available on the market.

The displaceability can be achieved in the simplest manner if the connector can be inserted into the change plates at both ends and can then be fixed.

For this purpose it is expedient if the change plates comprise receptacles, in particular bores, for the connector or the bars thereof and if the change plates include a releasable locking arrangement for fixing the connector.

The locking arrangement is achieved in that bars of the connector inserted into the receptacles are fixedly clamped. In this respect it is preferred if the bars are pressed against the walls of the receptacle or the cross-section of the receptacles is reduced. For this purpose a screw can be provided which "pulls" a pressure plate, which possibly has a wedge-shaped cross-section, against the bars in the receptacles for locking or fixing purposes.

In a preferred embodiment provision can be made for the change plates to each be combined with an additional dovetail plate which is disposed on the lower or upper side. It is then even possible for the screw for the pressure plate to be rotated by rotating the quick-change plate with respect to the connector.

In a further preferred embodiment, the change plates comprise a quick-release system on their upper or lower sides. This is preferably formed as a quick-release system which can also be attached and fixed on the change plate when rotated by 90 degrees. This can also be disposed such that the camera can be rotated with respect to the L-shaped holder fixed to the tripod head without its elevation being changed. It is then possible to leave or provide a small, conventional, universal quick-change plate on the camera and to attach the camera to the L-shaped holder by means of the quick-release system via the quick-change plate, wherein the orientation of the conventional quick-change plate on the camera is of no significance since the quick-release system can indeed be rotated.

Further details, features and advantages of the invention will become apparent from the following description of exemplified embodiments with the aid of the accompanying drawings.

DESCRIPTION OF THE PREFERRED EMBODIMENTS

FIG. 1 shows a perspective view of a first embodiment of an L-shaped holder;

FIG. 2 shows a perspective view of the L-shaped holder of FIG. 1 with the first change plate removed;

FIG. 3 shows a perspective view of a second embodiment of an L-shaped holder which also has a quick-release system and dovetail plates; and FIG. 4 shows a perspective view of the L-shaped holder of FIG. 3 with an indication of the rotation of the quick-release system.

FIGS. 1 and 2 show an L-shaped holder 1 for single-lens reflex cameras having a first, larger 2 change plate which can be attached to the housing of the camera via a screw, having a second, smaller change plate 3 and a connector 4 having two limbs 4A, B separated by a bend 5 for connecting the two change plates 2, 3.

Each change plate 2, 3 is disposed on one of the limbs 4A, B of the connector and can be displaced and even removed (cf. FIG. 2) in the direction of the double arrow on the connector or the respective limb 4A for the first change plate 2 and 4B for the second change plate 3.

The camera is thus screwed to the first, larger change plate 2 and the L-shaped holder is adjusted to the camera by displacing the change plate 2 with respect to the bend 5 and the second change plate 3 with respect to the bend 5 of the connector.

The change plates 2, 3 are substantially flat metal plates having a planar upper side 6, 7 for connecting to the camera.

Located on the lower side 8 of the first change plate 2, in addition to a locking lever 10, is a recess 11 having three bores 12A, B, C for the selective reception and arrangement of a fastening screw for the camera.

Disposed on the lower side 9 of the second change plate 3 are merely one bore 13 and also a locking screw 14.

On the longitudinal sides, the two change plates 2, 4 comprise grooves 15 extending in the longitudinal direction and allowing use of the change plates 2, 3 in a similar manner to a dovetail quick-change plate.

The connector 4 consists of two round bars 16, 17 which are braced together, extend in parallel, are bent and are braced in the region of the bend 5 by means of a perforated plate 22.

Provided in the end faces of the change plates 2, 3 are bores 18, 19 or 20, 21 for receiving the round bars 16, 17 which penetrate the change plates 2, 3. This allows the displacement of the change plates 2, 3 on the connector 4.

In order to fix the change plates 2, 3 in the desired position on the connector 4, a releasable locking arrangement is provided in each plate 2, 3 and can be actuated via the corresponding lever 10 or screw 14.

Upon rotation of the lever 10 or screw 14, in each case a pressure plate located on the remote side of the change plates 2, 3—as per FIG. 1—is pressed against the round bars 16, 17 in the bores 18, 19 or 20, 21 which means that these are each fixedly clamped in the bores.

The second embodiment, shown in FIGS. 3 and 4, of the L-shaped holder 100 substantially corresponds to the previous embodiment which means that corresponding reference numerals increased by 100 are used.

However, it differs from the previous embodiment by virtue of the fact that it comprises identical small change plates 102, 103 which are additionally each combined with a dovetail plate 150, 151 on their lower side 108, 109 remote from the camera.

The L-shaped holder 100 can be optionally attached to a commercially available quick-change system using these dovetail plates 150, 151.

As a further particular feature, the actuation of the locking or fixing arrangement of the change plates 102, 103 on the connector 104 in the case of the second L-shaped holder 100 is effected via a rotation of the dovetail plates 150, 151, which means that a corresponding screw can actuate the corresponding pressure plate.

In order for the dovetail plates 150, 151 to always be orientated perpendicular to the change plates 102, 103, the dovetail plates 150, 151 comprise protrusions 160, 161 by means of which they abut against the longitudinal or transverse sides of the change plates 102, 103.

As a further particular feature, the second L-shaped holder 100 includes on the upper side 106 of the change plate 102 a quick-release system 170 which is screwed to the change plate and optionally can be attached so as to be rotatable by 90 degrees which means that the orientation of a quick-change plate on the camera is of no significance.

The quick-release system 170 is used to fix single-lens reflex cameras to the L-shaped holder in a variable manner via adapter or quick-change plates, wherein this is effected such that the adapter plate is screwed to the camera and the adapter plate is releasably fixed to a guide on the base plate on the quick-release system. For this purpose, typically the adapter plate is clamped in the guide, whereby the opposite sides of the guide are designed to be movable relative to one another. The clamping process is effected via a screw or lever which correspondingly reduce the distance between the parts of the guide for fixing purposes and increase same for releasing purposes. It is thus possible to quickly interchange different cameras which each have a corresponding adapter plate, without changing the orientation etc. of the L-shaped holder on the tripod head.

LIST OF REFERENCE NUMERALS

1 L-shaped holder
2 Change plate
3 Change plate
4 Connector
4A, B Limb
5 Bend
6, 7 Upper side
8, 9 Lower side
10 Locking lever
11 Recess
12A, B, C Bore
13 Bore
14 Locking screw
15 Grooves
16, 17 Round bar
18, 19, 20, 21 Bore
22 Plate 100 L-shaped holders
102 Change plate
103 Change plate
104 Connector
108, 109 Lower side
150, 151 Dovetail plate
160, 161 Protrusion
170 Quick-release system

The invention claimed is:

1. L-shaped holder for optical devices having a first change plate which can be attached to the housing of the optical device via a screw, having a second change plate and a connector having two limbs, separated by a bend, for connecting the two change plates, wherein each change plate is disposed on one of the limbs of the connector, and wherein the change plates are connected to the connector such that the change plates can be displaced on the connector, wherein the connector includes two bars which are braced together, extend in parallel and are bent.

2. L-shaped holder as claimed in claim 1, wherein the bars consist of metal.

3. L-shaped holder as claimed in claim 1, wherein the bars are round bars.

4. L-shaped holder as claimed in claim 1, wherein the change plates comprises grooves which extend laterally in the longitudinal direction.

5. L-shaped holder as claimed in claim 1, wherein the change plates comprise receptacles for receiving one side of the connector.

6. L-shaped holder as claimed in claim 1, wherein the change plates comprise a releasable locking arrangement for fixing the connector.

7. L-shaped holder as claimed in claim 1, wherein the change plates comprise a dovetail plate on their upper or lower side.

8. L-shaped holder as claimed in claim 1, wherein the change plates comprise a quick-release system on their upper or lower side.

9. L-shaped holder as claimed in claim 8, wherein the quick-release system can be rotated by 90 degrees.

10. L-shaped holder as claimed in claim 7, wherein the dovetail plates can be rotated by 90 degrees.

11. L-shaped holder as claimed in claim 5, wherein the receptacles for receiving one side of the connector comprise bores.

12. L-shaped holder for optical devices having a first change plate which can be attached to the housing of the optical device via a screw, having a second change plate and a connector having two limbs, separated by a bend, for connecting the two change plates, wherein each change plate is disposed on one of the limbs of the connector, and wherein the change plates are connected to the connector such that the change plates can be displaced on the connector, wherein the change plates comprise a dovetail plate on their upper or lower side.

13. L-shaped holder as claimed in claim 12, wherein the change plates comprise receptacles for receiving one side of the connector.

14. L-shaped holder as claimed in claim 12, wherein the change plates comprise a quick-release system on their upper or lower side.

15. L-shaped holder as claimed in claim 14, wherein the quick-release system can be rotated by 90 degrees.

16. L-shaped holder as claimed in claim 12, wherein the dovetail plates can be rotated by 90 degrees.

17. L-shaped holder for optical devices having a first change plate which can be attached to the housing of the optical device via a screw, having a second change plate and a connector having two limbs, separated by a bend, for connecting the two change plates, wherein each change plate is disposed on one of the limbs of the connector, and wherein the change plates are connected to the connector such that the change plates can be displaced on the connector, wherein the change plates comprise a quick-release system on their upper or lower side.

18. L-shaped holder as claimed in claim 17, wherein the change plates comprise receptacles for receiving one side of the connector.

19. L-shaped holder as claimed in claim 17, wherein the quick-release system can be rotated by 90 degrees.

20. L-shaped holder as claimed in claim 19, wherein the change plates comprise a dovetail plate on their upper or lower side.

* * * * *